June 26, 1928.
J. K. MACOMBER
1,674,785
SAUSAGE LINKING MACHINE
Filed Sept. 25, 1924
4 Sheets-Sheet 3
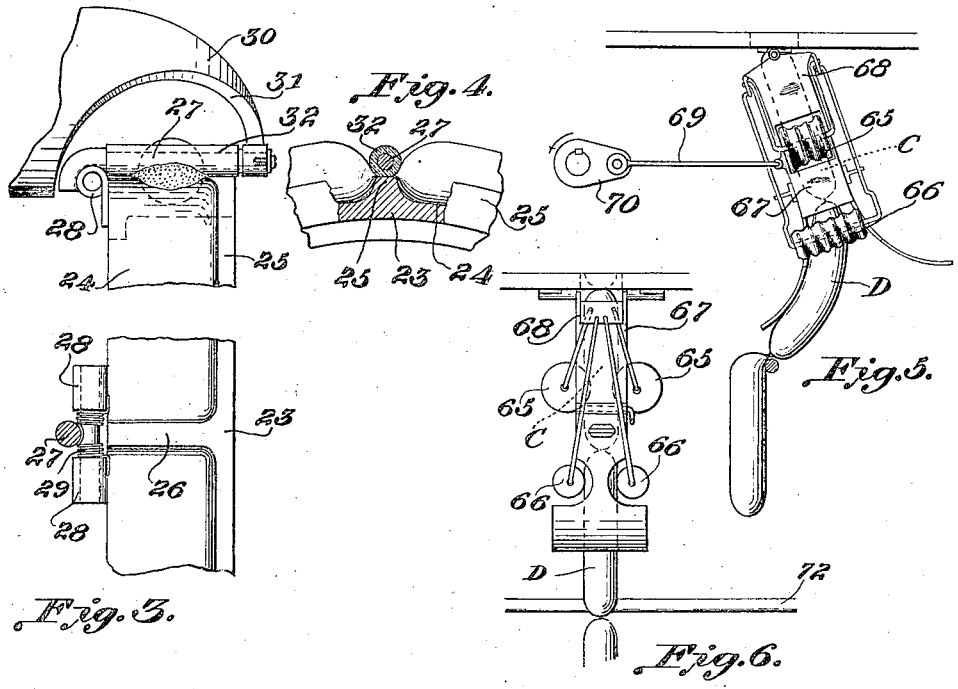
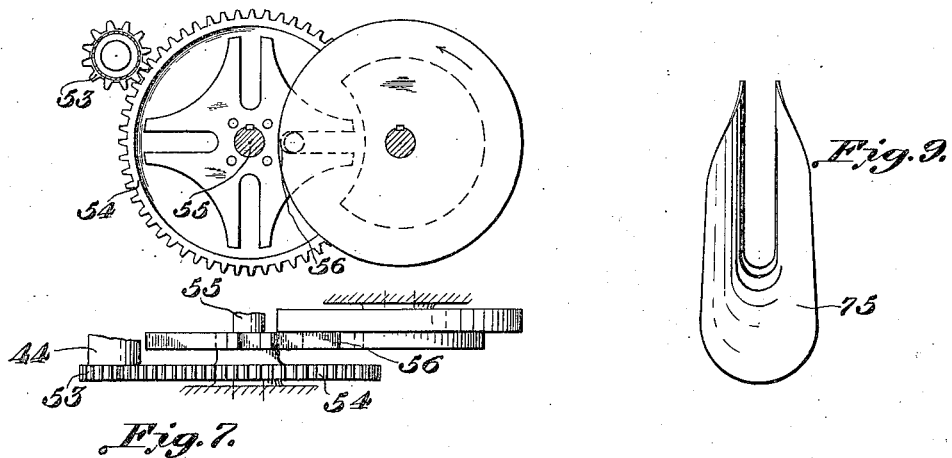
Inventor
James K. Macomber June 26, 1928.

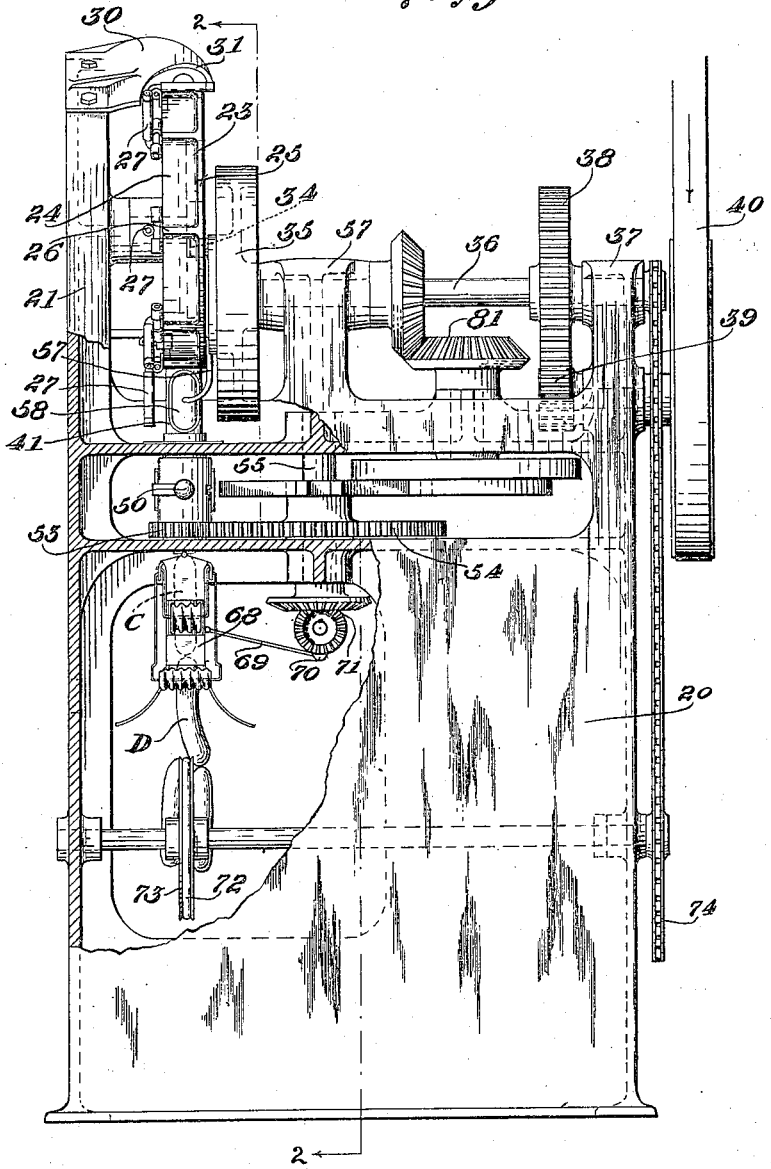

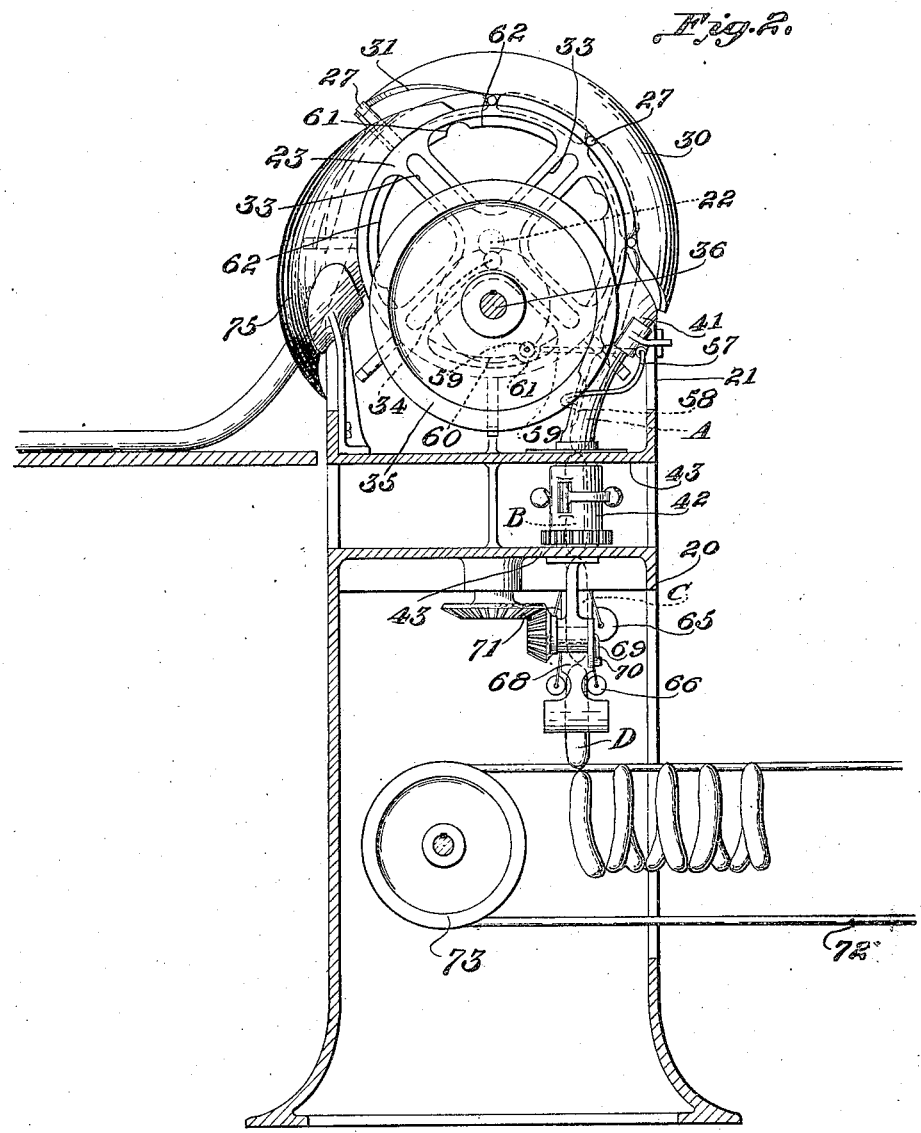

J. K. MACOMBER 1,674,785

SAUSAGE LINKING MACHINE

Filed Sept. 25, 1924

Inventor
James K. Macomber
By [signature]
Attorney

Patented June 26, 1928.

1,674,785

UNITED STATES PATENT OFFICE.

JAMES KEITH MACOMBER, OF WEST NEW YORK, NEW JERSEY.

SAUSAGE-LINKING MACHINE.

Application filed September 25, 1924. Serial No. 739,869.

My invention relates to sausage linking machines.

Sausage linking machines have not been used to any extent by manufacturers for the reason that they have not operated successfully under manufacturing conditions. Practically all sausages are linked by hand and this is naturally a slow and expensive process.

The method that is followed in making sausages by hand is apparently the best method that can be devised. By this process, the workman holds the stuffed skin or "casing" with both hands, his hands being spaced apart. He then compresses the casing between the thumb and fore-finger of each hand and twirls the segregated portion to form a twisted link.

The reason for the failure of many sausage linking machines has evidently been due to the fact that the method of linking employed by these machines was not similar to the hand method and they therefore were more liable to damage the delicate casing which holds the sausage meat. These machines also have failed to employ a hanging mechanism in which positive means are used to prevent the sausages from untwisting until they are safely hung and ready for the smoking process.

The primary object of my invention is the provision of means whereby sausages may be quickly, properly and uniformly linked and then hung in a manner convenient for smoking.

A further object is to provide such a machine which will closely follow the hand process of making. To this end the operation of the present machine is such that the stuffed casing is held against rotation at spaced points and the intermediate portion is rotated or twisted.

Another object is to provide a machine for this purpose which will perform all the necessary operations mechanically, an operator being only required for the purpose of placing the ends of the stuffed casings in the feed mechanism of the machine.

A still further object is to provide a sausage linking machine which will include a mechanism to feed the stuffed casings to the twisting mechanism and wherein the feeding mechanism will also compress or divide the stuffed casings into sausage lengths in a novel manner which minimizes any tendency to rupture the casing.

Another object is to provide a machine of this type which will include a flexible yet positive means to grasp the sausage links in such a manner as to insure that each sausage is twisted a proper amount and no more. This grasping mechanism is operated through the motion of the twisting cylinder through a scientific combination of inertia and centrifugal force so as to automatically grip the sausage to be twisted and to release the same after the twisting operation.

A further object is to incorporate in this machine a hanging mechanism equipped with means to prevent the links from untwisting but at the same time to allow the links freedom of motion along their axes to provide for takeup in the casing at the points being twisted.

Still a further object is to design the feeding and compressing mechanism, the twisting mechanism, and the hanging mechanism so that each will be a unitary structure and readily capable of use with other machines. In the embodiment shown, however, all three mechanisms operate together to form and hang the completed sausage.

Another object is to design the machine and construct it in such a manner that the means to compress and feed the stuffed casings to the twisting mechanism and the twistings mechanism itself will be intermittently operated and will be so synchronized that the two mechanisms will be alternately operated. This will prevent the casings from being torn by overlapping operations.

Still another object of the invention is to provide a form of intermittent gearing particularly adapted for use in a machine of this type.

Figure 1 is a side elevation of the machine, a part of the frame being broken away.

Figure 2 is a vertical section on the line 2—2 of Figure 1.

Figure 3 is a detail view showing the feeding and compressing mechanism of the machine.

Figure 4 is a detail view of the compressing or dividing mechanism of the machine.

Figure 5 is a view of the hanging mechanism by means of which the sausages are hung on a conveyor when completed.

Figure 6 is a view taken at right angles to Figure 5.

Figure 7 is a detail view in side elevation of the twisting mechanism driving gears.

Figure 8 is a detail showing a plan view of the driving gears actuating the twisting mechanism.

Figure 9 is a view showing the guide shield through which the stuffed casings are fed into the machine.

Figure 10:
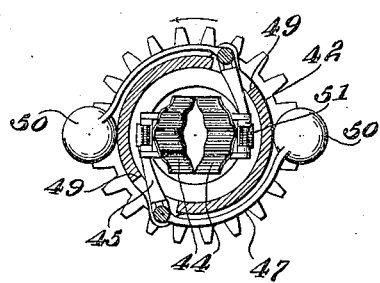
Figure 10 is a horizontal sectional view of the twisting mechanism with the top portion of the walls of the twisting chamber or cylinder broken away.

Referring to the drawings, wherein similar numerals indicate like parts throughout the views, the numeral 20 designates the supporting frame of the machine and 21 indicates an upstanding end wall. Stub shaft 22 is journaled in the end wall 21 and carries a feeding and compressing or dividing wheel 23. The wheel 23 has circumferentially spaced depressions 24 about its periphery, these depressions extending almost across the edge of the wheel. A raised rim 25 is thus left at one edge of the periphery of the wheel and shoulders 26 are between each depression 24. Compressing or dividing fingers 27 are journaled in brackets 28 carried at the edge of the feed wheel opposite the rim 25, the brackets being so positioned that a compressing finger 27 is alined with each shoulder 26. The fingers 27 are normally held upright by the action of springs 29 as shown in Figure 3. A cam plate 30 is attached to the top of the end wall 21 of the machine and extends over the upper portion of the feed wheel 23. When the feed wheel 23 is rotated, the fingers 27 will successively strike against the end 31 of the cam plate 30 and will be swung down upon their respective shoulders 26. In this manner the stuffed sausage casing will be gripped and drawn into the machine and will also be divided off into lengths and fed into the twisting mechanism. The fingers 27 are preferably covered with rubber tubing 32 so that they will not injure the sausage casing.

The feeding and compressing wheel 23 moves intermittently. While it is stationary the twisting mechanism, hereinafter described, moves to twist and link the sausage lengths which have been fed into it by the movement of the feeding wheel 23. Three quarters of a cycle are consumed in the feeding movement and one quarter in the twisting operation. The feeding movement is thus seen to be the more deliberate of the two, which is without question the ideal arrangement in the present embodiment of my invention.

The mechanism for intermittently rotating the feed wheel 23 comprises a form of Geneva gearing. The feed wheel 23 has four radial and connected slots 33 formed on its inner face. A pin 34 eccentrically mounted on the flywheel 35 moves in these slots to drive the feed wheel 23. Referring to Figure 2, it will be seen that when the pin 34 is passing about the upper portion of its orbit it will merely move along one edge of the connecting space between the slots 33 and there will be no motion of the feed wheel 23. However, when it passes about the lower portion of its orbit it will engage the lower extremity of the respective slot 33 and will move the feed wheel 23 a quarter of a revolution.

The flywheel 35 is fixed to a shaft 36 supported in journals 37. Shaft 36 is driven, through reducing gears 38 and 39, by any suitable motor power preferably transmitted by a belt 40.

A curved guide trough 41 is positioned at the rear of the feeding and compressing wheel 23 to guide the stuffed casing, now compressed for twisting, to the twisting mechanism. In order that the length of stuffed casing may be twisted at each end to form it into a sausage when it is rotated in the twisting mechanism, the lengths of casing without and at either end of the twisting mechanism must be held against rotation. A means to prevent rotation or turning of the length of stuffed casing which has not yet entered the twisting mechanism is carried by the guide plate 41. A bell crank lever 57 is pivoted upon the guide plate or trough 41. One end of the bell crank lever carries a clamp 58 which is positioned opposite the guide plate 41. The other arm of the bell crank 57 carries a roller 59 which bears on a camway 60 fixed to the feed wheel 23. The camway 60 has a plurality of pockets 61 spaced about its surface. While the feed wheel 23 is moving, the roller 59 will bear upon the raised circular surface 62 of the camway. The opposite end 58 will then be held in raised position and out of the guide trough 41. The pockets 61 of the camway 60 are so positioned with respect to the depressions 24 upon the feed wheel that when a length of stuffed casing, compressed or divided (as indicated at A, Figure 2) is moved to a point just above the twisting mechanism 42, hereinafter described, the roller 59 will drop into a pocket 61. This movement will permit the opposite end of the bell crank to drop and the clamp 58 will swing against the section A and hold it against rotation. As will be hereinafter set forth, the feed wheel 23 will stop at this time and the twisting mechanism will operate.

The twisting mechanism is a unitary structure and may be used with any type of feeding mechanism.

Figure 11:
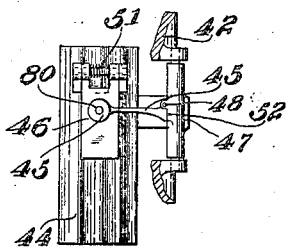
Figure 11 is a detail view showing one of the grasping members of the twisting mechanism.

As shown in Figures 10 to 13, inclusive, the twisting mechanism is encased in and includes a preferably vertically arranged open-ended cylinder or chamber 42. The cylinder 42 is rotatably mounted in horizontal partitions carried by the frame 20 of the machine. Graspers or gripping plates 44 are provided to engage the section of stuffed casing fed into the twisting mechanism. The graspers are supported in the cylinder 42 in such a manner that they will be moved together to grip the stuffed casing and rotate it and at the same time will permit the stuffed casing to move upwardly as it is twisted into a sausage. As shown in Figure 11, the gripping plates 44 are pivoted on a horizontal pivot to a backplate 46. This backplate 46 is in turn pivotally connected at 80 to a lever 45 whereby the gripping plate 44 and backplate 46 may swing about in a vertical plane. The lever 45 is attached to a weighted arm 47 at the inner end of the latter and may swing in a vertical plane on the horizontal pintle 48 carried by the arm 47. The weighted arms 47 are pivotally mounted in openings 49 in the walls of the cylinder 42 and their outer ends carry weights 50.

Figure 12:
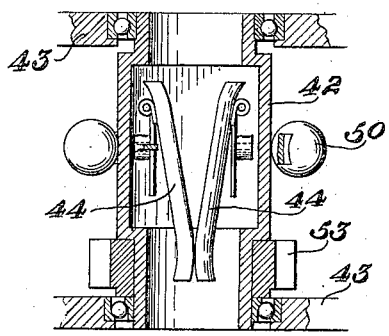
Figure 12 is a vertical sectional view through the twisting cylinder.
Figure 13:
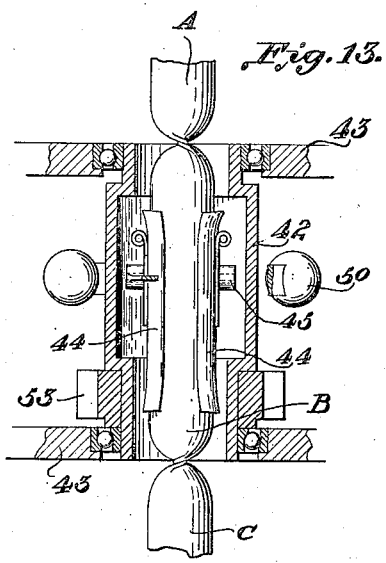
Figure 13 is a view similar to Figure 12 but showing a sausage being twisted.

The pivotal connection between the gripping plates 44 and the backplates 46 includes a spring 51 and the latter tends to hold the lower end of the gripping plates or graspers together, as shown in Figure 12. The sausages move slightly upward as they are twisted into links and the swinging connection between the backplate 46 and the weighted arms 47 through the levers 45 pivoted at 48 and 80 is intended to accommodate this movement. The outer ends of levers 45 are shouldered, however, at 52 so that the graspers 44 will be held upright and opposite each other. The graspers are vertically corrugated to insure a secure grip on the sausage casing and to guide the sausage through the gripping mechanism.

The twisting cylinder has a gear wheel 53 fixed thereto and which meshes with the gear 54 carried on a shaft 55 which is intermittently operated by a Geneva gear arrangement 56 shown in Figures 7 and 8. The Geneva gear 56 is operated by a gear connection 81 with the shaft 36. The intermittent gearing 33 and 34, whereby the feeding and compressing mechanism is actuated, is synchronized with the Geneva gear 56 of the twisting mechanism to the end that the twisting cylinder 42 will only rotate when the feed wheel 23 is stationary. While the twisting cylinder 42 is stationary, the weighted arms 47 carried thereby will be in approximately the position shown in Figure 10 and the levers 45 and the graspers 44 will be spread apart at their upper ends. This will permit lengths of stuffed casing to be moved between them by the action of the feed wheel 23. The lower ends will be pressed toward each other by the springs 51 which are under a very slight tension, only sufficient to guide the movement of the sections of stuffed casing and to prevent the links from untwisting after the twisting operation. When the feed wheel 23 stops and the twisting cylinder 42 begins to revolve, the graspers 44 will immediately exert an appreciable force upon the section of stuffed casing (indicated by the letter B) in the cylinder. This initial force is practically instantaneous and is due to the inertia of the weights 50 which gives them a tendency to lag behind. Continued movement of the cylinder will bring an added centrifugal force into play, the combination of the interia force and the centrifugal force reaching a maximum during the second quarter of the complete revolution that the cylinder 42 makes. The time of the greatest pressure and the pressure itself can be varied by a change of the position of the weights 50, but experiments have shown that the greatest resistance to twisting occurs during this second quarter of the revolution. During the last half of the revolution the pressure between the graspers 44 will be decreased. This is due to the inertia this time causing a tendency of the weights 50 to overtake the twisting cylinder 42 as it slows down. Thus they will assume their normal positions shown in Figure 10 when the cylinder 42 stops. The graspers 44 will therefore be in open position and sections of stuffed casing may be moved between them by the feed wheel 23. It will be seen that this twisting mechanism is very efficient. A slight pressure is always exerted between the graspers 44 by their springs 51. This pressure is constant and is sufficient to prevent the graspers from sliding about the stuffed casing when the cylinder 42 first starts to rotate and, as before mentioned, to prevent the link from untwisting after it is twisted.

The pivotal hanging of the graspers 44 which permits them to move up and down also increases the efficiency of the machine. When twisted, the sausages move upwardly because the twisting draws up the skin casing between the sections A and B. By reason of the fact that the graspers 44 are free to move upwardly while the cylinder 42 is turning, the casing about the sausages will not be broken. It is also evident that this type of twisting mechanism will also adapt itself to any width of sausage.

After the sausages leave the twising cylinder 42, they pass through the hanging mechanism 68. This comprises a swinging frame 67 on which are mounted two pairs of restraining elements which allow the sausage links to move freely along their axes but which prevent any rotation of the sausages after emerging from the twisting cylinder. Several practical variations of restraining means have been devised for this purpose, but the preferred type shown in Figures 5 and 6 consists of two pairs of corrugated spools or rollers 65 and 66 suspended on swinging pivots arranged one pair above the other. The upper pair 65 will bear against the sausage indicated by the letter C while the lower pair 66 bears against the sausage in position D. Both sausages will thus be held against rotation, the sausage D being prevented from twisting and the sausage C being held against rotation while the section B of stuffed casing in the twisting cylinder is being rotated.

The hanging mechanism 68 is actuated by a rod 69 pivoted to a crank 70. Crank 70 is geared to the shaft 55 by gears 71 and is therefore intermittently moved when the twisting cylinder 42 is moved. The hanging mechanism 68 is swung from side to side by crank 70 and the sausages leaving the machine will thereby be alternately dropped two at a time upon either side of a conveyor belt 72. Conveyor 72 is moved on pulley 73 by a sprocket wheel 74 rotated by the shaft 36.

In operating the machine, lengths of stuffed skins or casings will be fed to the feed wheel 23 through the guide shield 75 by an operator. As the feed wheel rotates, the casing will be gripped by the fingers 27 and will be drawn into the machine. The fingers 27 will also divide the meat within the casing into sausage lengths as the feed wheel 23 rotates. The ratio and arrangement of the gearing by which the feed wheel 23 is moved is preferably such that when the feed wheel 23 moves it will release and feed off two lengths of compressed casing for each operation. The first of these lengths C will be passed through the twisting cylinder 42. The second length B will stop between the graspers 44 in the twisting cylinder while a third length will stop in the guide above the twisting cylinder opposite the clamp 58 on the bell crank 57. The feed wheel 23 will then be stopped by the actuation of the intermittent gearing 33—34. The Geneva gearing 56 which turns the twisting cylinder 42 will then actuate that cylinder. The section of sausage B will then be turned by the twisting mechanism 42 while the section A is held against rotation by the clamp 58 and the section C is held against rotation by the corrugated rollers 65. When the twisting cylinder 42 stops, the succeeding movement of the feed wheel 23, feeding out two sections of stuffed casing, will move the section of casing in the twisting cylinder 42 to position D, while that at A will move to position C. The new section of stuffed casing in the position B (in the twisting cylinder 42) will be rotated as explained and the customary twisted joints will be formed at its upper and lower ends. Since every alternate link is held against rotation while the intermediate links are twisted at both ends, it is evident that high production speed can be obtained as two links are completed for each operation of the machine.

While the twisting cylinder 42 is rotating, the hanging mechanism 68 is swung from one extreme position to the other by action of the crank 70. It remains stationary in the displaced position during the succeeding movement of the feed wheel 23 and two links of sausage are moved down on one side of the conveyor belt 72. The hanging mechanism swings to its other position during the next operation of the twisting cylinder and two links are fed onto the other side of the conveyor during the next following movement of the feed wheel. The twisted sausages are thus hung on the moving conveyor in the manner shown in Figure 2. The sausages are lifted from the conveyor belt 72 on the regulation smoke stick or some other suitable contrivance and are then put through the smoking process which relieves any remaining untwisting tendency at the joints.

I claim:

1. A sausage linking machine comprising means to rotate a section of a stuffed sausage casing and means at either end of said first-named means to grip the adjacent sections of the casing at a point adjacent the middle of the section to hold said sections against rotation.

2. A sausage linking machine comprising means to rotate a section of a stuffed sausage casing, means at either end of said first-named means to grip the adjacent sections of the casing at a point adjacent the middle of the section to hold said sections against rotation and means to feed the sections of stuffed casing through said rotating means.

3. A sausage linking machine including a rotatable member, means within said member to normally engage a length of stuffed casing, whereby it will be held against untwisting and means to increase the grip of said means when the rotatable member turns.

4. The combination in a sausage linking machine, of a rotatable member, means carried by said rotatable member to engage a section of stuffed casing whereby it will be held against untwisting rotation, centrifugally actuated means connected to said first-named means whereby said means will be moved to firmly grip the section of stuffed casing and rotate the same when the rotatable member is turned.

5. The combination in a sausage linking machine including a rotatable member adapted to twist a section of stuffed casing, of jaws carried by said member and adapted to be moved together to grasp the section of casing and rotate it with the twisting member, said jaws being movable longitudinally of the casing to accommodate shrinkage.

6. The combination in a sausage linking machine including a rotatable member adapted to feed lengths of stuffed casing to the twisting mechanism of the machine, of circumferentially spaced and normally upstanding fingers pivoted upon one edge of said feed member and means to turn said fingers down upon said member to grip the stuffed casing and divide it into sausage lengths.

7. The combination in a sausage linking machine including a member adapted to feed lengths of stuffed casing to the twisting mechanism of the machine, of spaced pivoted fingers carried by said member, the free ends of said fingers being normally spaced from said member and means to move the free ends of said fingers into engagement with said member to grip the stuffed casing and divide it into sausage lengths.

8. The combination in a sausage linking machine including a rotating member adapted to feed lengths of stuffed casing to the twisting mechanism of the machine, of circumferentially spaced fingers pivoted to said rotating member, the active edges of said fingers normally being held separated from said rotating feed member, and means to bring said fingers into engagement with said feed member to grip the stuffed casing and divide it into sausage lengths.

9. The combination with a sausage linking machine including feeding mechanism and actuating means therefor, of a hanging mechanism for the linked sausages comprising a conveyor belt, a swinging frame pivotally supported above said belt, pivotally hung corrugated rollers carried in said frame through which the sausages are adapted to be fed, actuating means to swing said frame to either side of said conveyor belt, said actuating means being synchronized with said feeding mechanism actuating means whereby the sausages will be alternately hung on either side of said conveyor belt.

10. A sausage linking machine including a rotatable twisting member, means to intermittently rotate said twisting member, gripping means carried by said twisting member and adapted to be moved by centrifugal action to engage a section of stuffed casing when said twisting member rotates, said gripping means being opened by its own inertia when said twisting member ceases rotation.

11. A sausage linking machine including an intermittently rotating twisting member, gripping members pivotally carried by said twisting member and provided with weights at their outer ends, said twisting members being moved together to grip a section of stuffed casing by centrifugal force when said twisting member is rotated and being moved apart by the inertia of the weights when the twisting member ceases rotation.

JAMES KEITH MACOMBER.